US009933573B2

(12) United States Patent
Lee et al.

(10) Patent No.: US 9,933,573 B2
(45) Date of Patent: Apr. 3, 2018

(54) TUNABLE THREE-PORT WAVELENGTH SPLITTER, FOR OPTICAL COMMUNICATION AND THE MULTIPLEXING AND DE-MULTIPLEXING OF OPTICAL SIGNALS

(71) Applicant: DiCon Fiberoptics, Inc., Richmond, CA (US)

(72) Inventors: Jeffrey Boryean Lee, El Sobrante, CA (US); Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 48 days.

(21) Appl. No.: 15/081,294

(22) Filed: Mar. 25, 2016

(65) Prior Publication Data
US 2017/0276877 A1  Sep. 28, 2017

(51) Int. Cl.
G02B 6/293 (2006.01)
H04J 14/02 (2006.01)
G02B 6/32 (2006.01)

(52) U.S. Cl.
CPC ...... *G02B 6/29313* (2013.01); *G02B 6/29311* (2013.01); *G02B 6/29395* (2013.01); *G02B 6/32* (2013.01); *H04J 14/0212* (2013.01)

(58) Field of Classification Search
None
See application file for complete search history.

(56) References Cited

U.S. PATENT DOCUMENTS

| 6,876,475 | B1 * | 4/2005 | Trisnadi | G02B 6/2713 359/237 |
|---|---|---|---|---|
| 7,085,492 | B2 | 8/2006 | Ibsen et al. | |
| 7,899,330 | B2 | 3/2011 | Ye et al. | |
| 2003/0179990 | A1 | 9/2003 | Weber et al. | |

(Continued)

OTHER PUBLICATIONS

"Reconfigurable Optical Add/Drop Multiplexer," Optoplex Corporation. Datasheet for 3-Port ROADM/ TOADM. 2 pages. Retrieved Mar. 28, 2016 from <http://web.archive.org/web/20160328210744/http://www.optoplex.com/download/Optical_Add_Drop_Multiplexer.pdf>.

(Continued)

*Primary Examiner* — Jerry Rahll
(74) *Attorney, Agent, or Firm* — Vierra Magen Marcus LLP

(57) ABSTRACT

A tunable optical device uses a diffraction grating to angularly disperse a collimated beam carrying multiple wavelengths into multiple individually collimated wavelength beams, and then refocuses each of the individual collimated beams to its own focusing point on a moving plate that is located in the region of the focus plane. One or more reflective dots on the moving plate then selectively reflect particular wavelength(s) back to a first output port. The unselected wavelengths are transmitted through the moving plate, where they are then recombined and sent to a second output port. In a typical optical network architecture, the selected wavelength(s) could be viewed as the dropped traffic at a node of the optical network, while the unselected wavelengths could be viewed as the express traffic that is being passed to another node of the network. The device can also be used as a wavelength or beam combiner as well as a splitter.

43 Claims, 11 Drawing Sheets

(56) References Cited

U.S. PATENT DOCUMENTS

2004/0136074 A1    7/2004   Ford et al.
2004/0252938 A1   12/2004   Ducellier et al.
2005/0213978 A1    9/2005   Yamashita et al.
2006/0098981 A1    5/2006   Miura et al.

OTHER PUBLICATIONS

Eldada, "ROADM Architectures and Technologies for Agile Optical Networks," Proceedings of SPIE, vol. 6476, Optoelectronic Integrated Circuits IX. 647605. 12 pages. Feb. 14, 2007.
Wilson et al., "Spectral Passband Filter With Independently Variable Center Wavelength and Bandwidth," IEEE Photonics Technology Letters, 18(15). pp. 1660-1662. Aug. 1, 2006.

\* cited by examiner

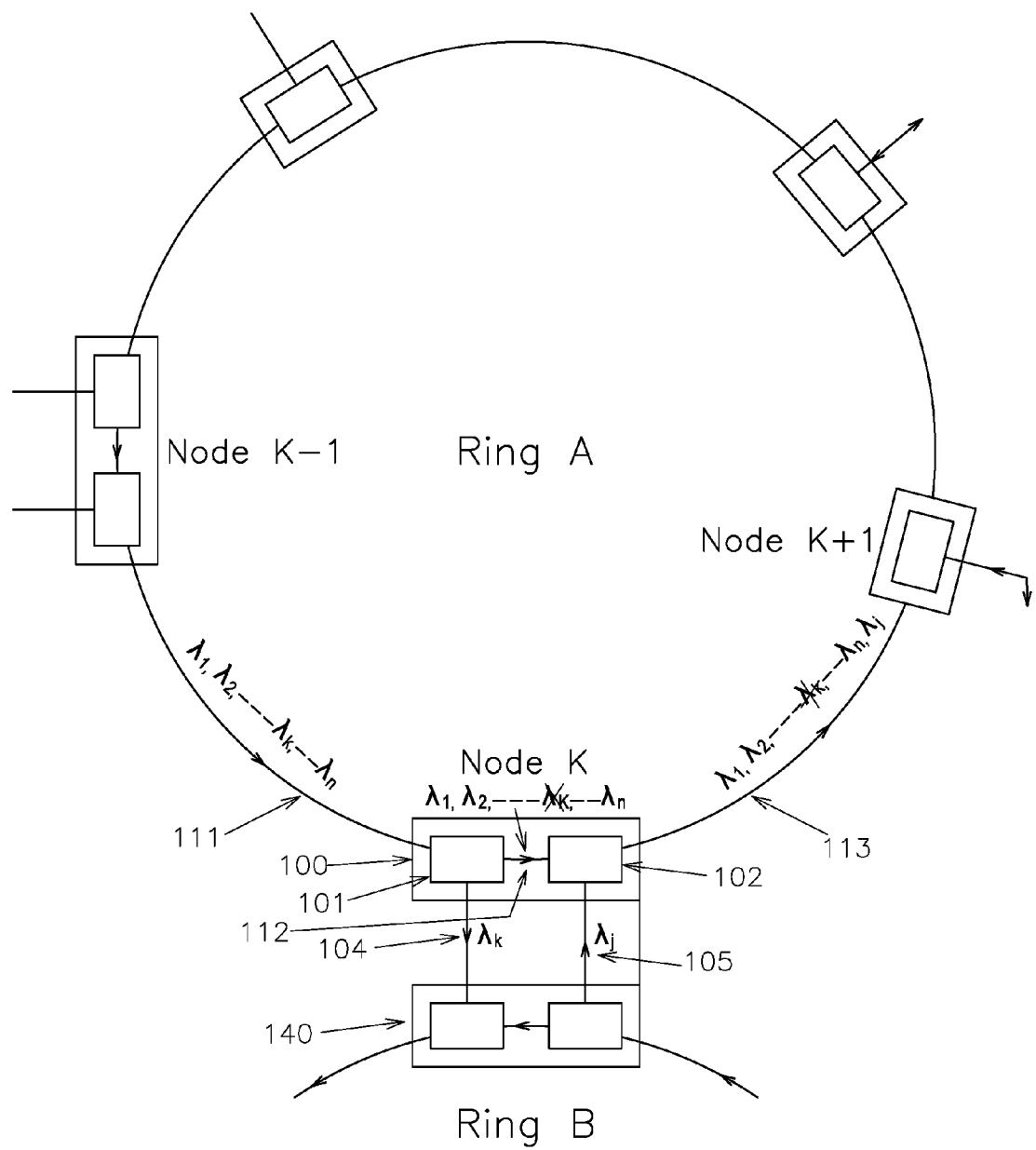
Fig. 1A—Prior Art

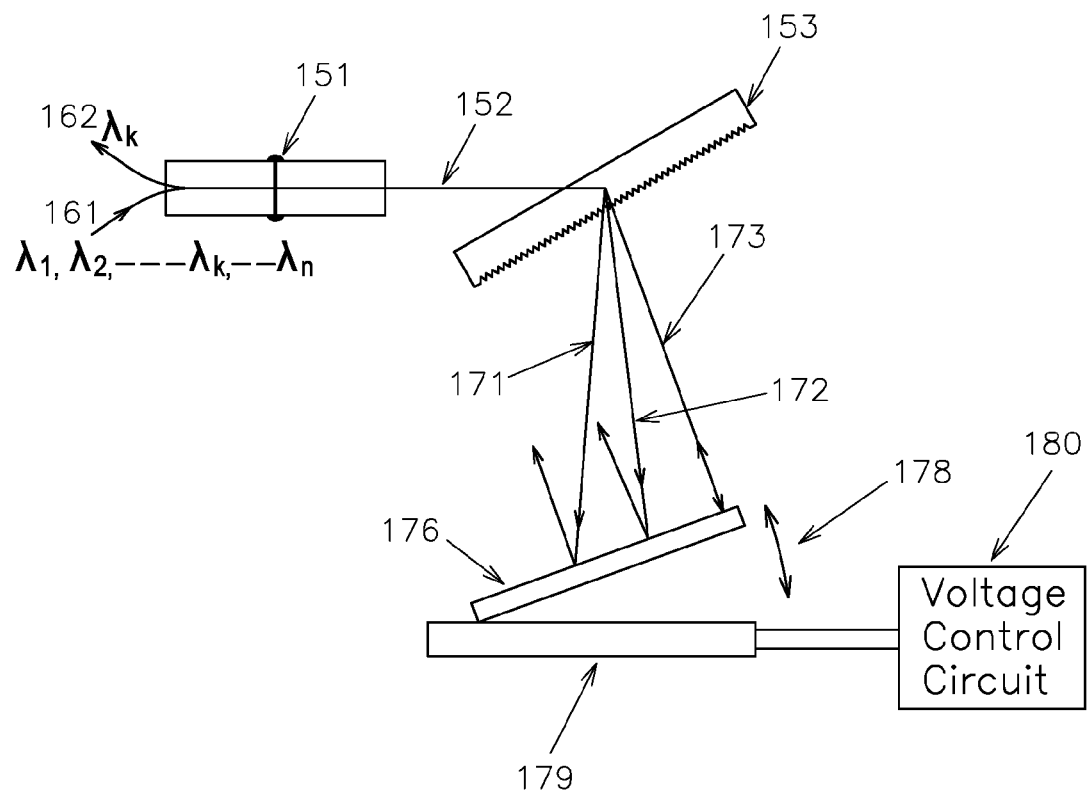
Fig. 1B—Prior Art

TUNABLE THREE-PORT WAVELENGTH SPLITTER, FOR OPTICAL COMMUNICATION AND THE MULTIPLEXING AND DE-MULTIPLEXING OF OPTICAL SIGNALS

BACKGROUND

The following relates generally to optical components used in optical communication networks, and, more specifically, to an optical device that can arbitrarily segregate wavelengths into two groups being sent to two separate network nodes.

Optical communication networks are built by combining sub-systems, modules, or components which perform specific functions, including the function of selecting or removing a particular wavelength or group of wavelengths. Briefly, multiple optical signals can be transmitted simultaneously by encoding them in separate carrier wavelengths similar to the way radio stations use different carrier frequencies to which the end user tunes. Encoding multiple signals using different carrier wavelengths is referred to as Dense Wavelength Division Multiplexing (DWDM). A general description of optical networking functions and applications can be found in "Introduction to DWDM Technology", by S. Kartalopoulos, Wiley-Interscience, 2000.

DWDM Technology has been widely deployed in long haul communications networks. Recently, this technology started migrating to short-haul optical communications networks such as Digital TV delivery, Fiber-to-the-home (FTTH), Internet access, Local Area Networks, back-haul connections for cellular base stations, Wi-Fi hotspots, and other forms of broadband access. At various locations or nodes of an optical network, it is desirable and necessary to split or segregate the wavelengths being carried on a fiber, onto two arbitrary groups, with one group being "dropped" to local equipment, and the other group being passed to another node of the network.

Two-port tunable optical filters of the prior art are suitable for selecting a single wavelength, or a band of contiguous wavelengths, to be dropped from a multiple-wavelength fiber. However, with two-port tunable optical filters, the unselected wavelengths are essentially discarded, and so additional optical components, such as optical splitters and wavelength blockers, must be incorporated to handle the wavelengths that are not being selected or dropped, i.e., the "express" traffic that is being sent to another node of the network. Furthermore, two-port tunable optical filters of the prior art are designed to select a single wavelength or contiguous band or range of wavelengths, and are not able to select any arbitrary set or group of wavelengths.

Modern optical networks make use of Reconfigurable Optical Add/Drop Modules (ROADMs), that are designed to drop and add wavelengths at optical network nodes, while passing on the express traffic to other nodes of the network. Ideally, a ROADM will allow the dropping of any arbitrary subset of wavelengths (up to the number of available drop ports), while passing on all of the unselected wavelengths. As such, three-port wavelength splitter, that is capable of splitting the wavelengths on a fiber into two arbitrary groups of wavelengths, provides enhanced functionality that is highly desirable for use in modern reconfigurable optical networks, as a key element of a ROADM-based network architecture.

SUMMARY

In a first set of aspects, a tunable wavelength optical device includes a diffraction section, a plate, and an actuator. The diffraction section is configured such that light of different wavelengths of a coupled beam of light from a first port are diffracted into different wavelength components, focusing the light of the different wavelength components within a focal region. The plate is at least partially positioned within a portion of the focal region. The plate has one or more first reflective sections that reflect light of one of more of the wavelength components coupled to the plate from the first diffraction section towards the first diffraction section, so that light is diffracted a first time and a second time by the first diffraction section in an optical path between the first port and a second port. The plate directs light of wavelength components other than those coupled to the first reflective sections in an optical path between the first port and a third port, along which the light of wavelength components other than those coupled to the first reflective sections is diffracted a first time by the first diffraction section. The actuator is connected to change the position of the plate within the focal region relative to the first diffraction section, whereby a first set of a selected one or more of the wavelength components each focus on one of the first reflective sections of the plate to be reflected between the first port and the second port along the optical path between them, and one or more of the wavelength components not in the first set are directed between the first port and the third port.

In a second set of aspects, a tunable wavelength optical device includes a diffraction section, a plate, and an actuator. The diffraction section is configured such that light of different wavelengths of a coupled beam of light from a first port are diffracted into different wavelength components, focusing the light of the different wavelength components within a focal region. The plate is at least partially positioned within a portion of the focal region. The plate has one or more reflective sections that reflect light of one of more of the wavelength components coupled thereto from the first diffraction section back towards the first diffraction section, so that light is diffracted a first time and a second time by the first diffraction section in an optical path between the first port and a second port. The actuator is connected to change the position of the plate within the focal region relative to the first diffraction section so that a selected one or more of the wavelength components each focus on one of the reflective sections of the plate to be reflected between the first port and the second port along the optical path between them.

Additional aspects relate to a method in which a beam of light is received at a first port. The beam of light is directed to be incident on a diffraction section, which diffracts the beam of light into different wavelength components, such that the light of the different wavelength components is focused within a focal region. A plate, having one or more reflective sections, is positioned to be at least partially within a portion of the focal region. The plate is positioned so that: a first set of a selected one or more of the wavelength components incident on the one or more reflective sections from the diffraction section each focus on one of the reflective sections of the plate to be reflected back towards the diffraction section; and light of wavelength components other than those incident on the reflective section are directed by the plate in an optical path between the plate and a third port. The diffraction section diffracts the first set of wavelength components a second time in an optical path from the plate to a second port.

Further aspect relate to a method in which a first set of one or more wavelength components is received at a first port. The first set of wavelength components is directed to be incident on a diffraction section, which diffracts the first set of wavelength components so that they are focused within a focal region. A second set of one or more wavelength components is received at a second port. The second set of wavelength components is directed to be incident on a plate. The plate has one or more reflective sections and is positioned to be at least partially within a portion of the focal region. The plate is positioned so that: the first set of wavelength components is incident on the one or more reflective sections from the diffraction section to be reflected back towards the diffraction section; and the second set of wavelength components are directed by the plate in an optical path between the second port and the diffraction section. The diffraction section diffracts the first and second sets of wavelength components, whereby the first and second sets of wavelength components are combined into a beam of light in an optical path from the plate to a third port.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 1A illustrates a prior art optical network utilizing a three-port wavelength multiplexer/de-multiplexer to add and drop wavelengths or signals to/from the node, while passing the remaining wavelengths to the next node in the ring.

FIG. 1B illustrates a prior art example of a tunable optical filter that can select a single wavelength or a contiguous range of wavelengths.

DETAILED DESCRIPTION

Figure 2:
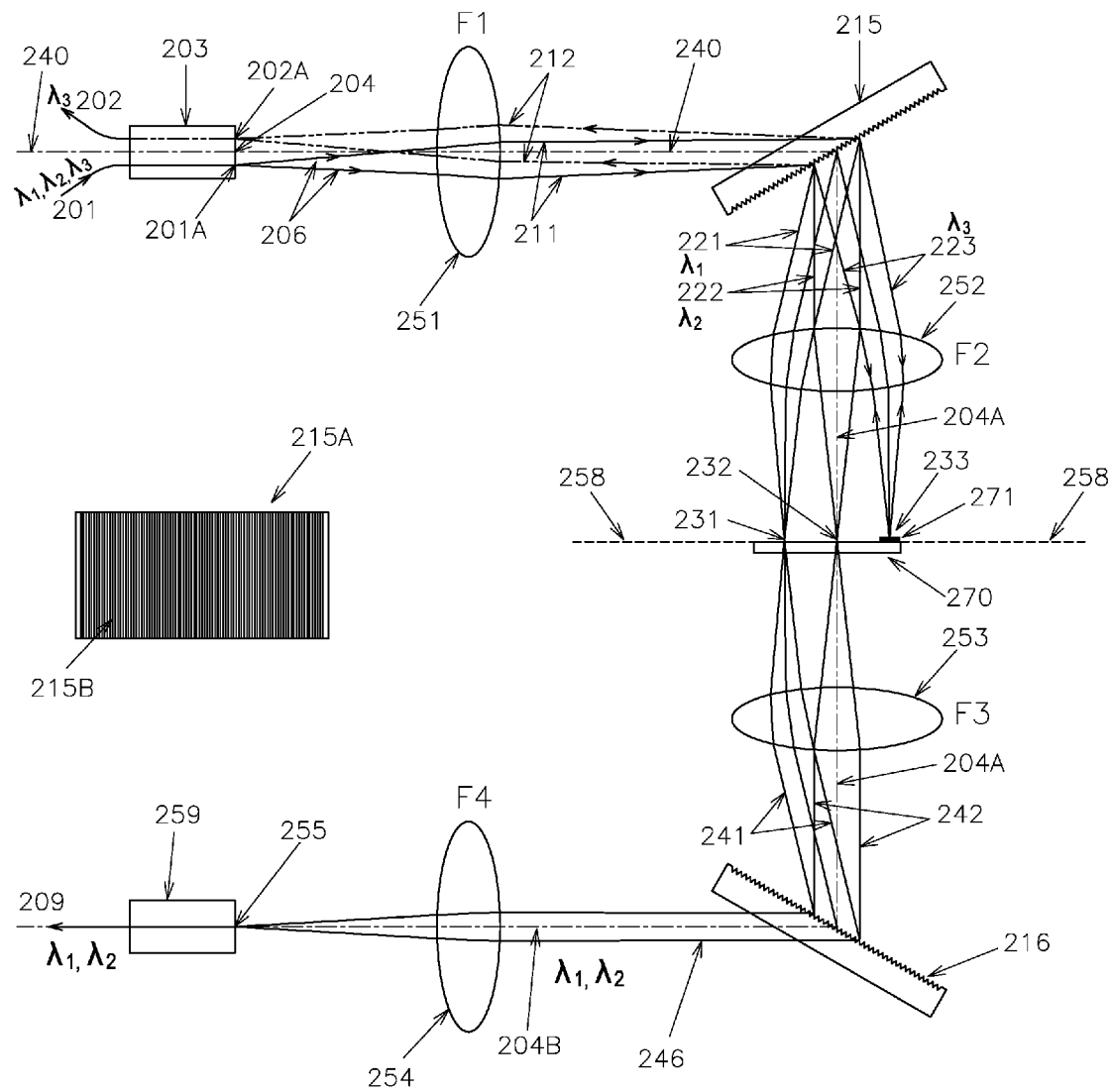
FIG. 2 shows one exemplary embodiment for a tunable optical device. One of the multiple wavelengths from an incident signal is selected and sent to a first output port and the remaining wavelengths are recombined and sent to a second output port.

The devices and methods described in the following utilize a diffraction section, including a diffraction grating, to angularly disperse a collimated beam carrying multiple wavelengths into multiple individually collimated wavelength beams, and then refocuses each of the individual collimated beams to its own focusing point on a moving plate that is located in the region of the focus plane. A reflective section or one or more reflective dots on the moving plate then selectively reflect particular wavelength (s) back to a first output port. The unselected wavelengths are transmitted through the moving plate, where they are then recombined and sent to a second output port. In a typical optical network architecture, the selected wavelength (s) could be viewed as the dropped traffic at a node of the optical network, while the unselected wavelengths could be viewed as the express traffic that is being passed to another node of the network.

FIG. 1A illustrates how a pair of three-port tunable wavelength add-drop elements, configured as a de-multiplexer and multiplexer (101 and 102 respectively), might be used in a prior art optical communication network to segregate the multiple wavelengths of an optical signal. The multiple wavelengths $\lambda_1, \lambda_2, \ldots, \lambda_k$, and $\lambda_n$ are carried by the incoming fiber 111, which is part of RingA, and enter the three-port device 101 at its input port. Three-port device 101 is configured as a de-multiplexer. One of these multiple wavelengths $\lambda_k$ is dropped to the output port (or drop port) 104, and is picked up by the other node 140, that is part of Ring B. The rest of wavelengths from incoming fiber 111 go to the other output port (also called the express port) 112, and then enter the express port 112 of the other three-port device 102, which is configured as a multiplexer. A wavelength $\lambda_J$ is added to the three port device 102, and is combined with the input from the express port 112, with the merged traffic being directed to output port 113. Three-port devices 101 and 102 may be physically and structurally identical, but are optically used in "reverse" directions, as a de-multiplexer and multiplexer, respectively.

FIG. 1B, excerpted from U.S. Pat. No. 7,899,330, illustrates a two-port tunable optical filter of the prior art, in which a diffraction grating and a Micro-Electro-Mechanical-System (MEMS)-based mirror are used to select a single wavelength, or a contiguous subset of wavelengths, from a larger group of wavelengths that have been angularly dispersed via the diffraction grating. The optical power of an input fiber 161 carrying multiple wavelengths is collimated by a lens assembly 151 and then enters a one-dimensional linear diffraction grating 153, which disperses the different wavelengths at slightly different angles, as illustrated by rays 171, 172 and 173, respectively. One wavelength 173 is selectively reflected by a rotatable mirror 176 (its rotation is indicated by 178) back to an output fiber 162, after passing through the diffraction grating 153 a second time. The rotation angle of the mirror is controlled by the control voltage 180. However, the rest of the multiple wavelengths from input fiber 161 (as illustrated by rays 171 and 172) are dispersed and effectively lost or discarded. This makes the prior art two-port tunable optical filter of FIG. 1B less desirable for use within a ROADM node, as the express wavelengths are being discarded.

FIG. 2 illustrates one embodiment in which one of the multiple wavelengths from an incident signal is selected and sent to a first output port, and the remaining wavelengths are recombined by a set of optical elements, and sent to a second output port. An input optical fiber 201 carries an optical signal consisting of at least two wavelengths, shown in FIG. 2 as multiple wavelengths $\lambda_1$, $\lambda_2$, and $\lambda_3$. Obviously, a larger or smaller number of wavelengths than three may be used. The fiber end face 201A of the input fiber 201 and the fiber end face 202A of the output fiber 202 (as described below) are embedded in a ceramic or glass ferrule 203 and are preferably on the opposite sides with respect to the optical axis 240, which is defined by the lens 251. (In this discussion, "port" is used largely interchangeably to refer to either the "end face" at the end of a fiber or the location within a ferrule where this fiber end would be held.) Physically the relative position of fiber 201 and 202 may be chosen somewhat arbitrarily depending on the distance and relative orientation between two lenses 251 and 252, their respective focal lengths and other factors, but being on opposite sides with respect to the optical axis 240 makes the optical alignment and assembly easier. Lenses used can be conventional refractive-type lenses, Graded Index (GRIN) lenses, or other type of lenses that have an equivalent focal length. For convenience of assembly, the input fiber 201 and output fiber 202 can be terminated at the end surface 204 of ferrule 203. The optical signal exits the fiber end face 201A (as shown by rays 206) and is coupled to the first diffraction section of lens 251, grating 215, and lens 252, where it is collimated by the lens 251 with a focal length of F1, emerges from lens 251 as a collimated beam 211, tilted by a small angle with respect to the optical axis 240, and then hits the surface of a one-dimensional linear diffraction grating 215. Assuming for this example that there are three wavelengths present in collimated beam 240, the diffraction grating 215 angularly disperses the collimated beam 240 into three parallel and individually collimated beams, 221, 222, and 223, carrying the three different wavelengths, respectively. The three parallel beams, 221, 222, and 223 are then focused by a second lens 252, with focal length F2, to three separate points, 231, 232 and 233, respectively, all of which lie in the focal plane 258.

As indicated by illustration 215A within FIG. 2, showing another view of diffraction grating 215, a one-dimensional linear diffraction grating consists of a large number of linear grooves 215B inscribed in a transparent substrate. The spacing between two adjacent grooves is designed to be a fraction of the operating wavelength, or wavelength range. The optical loss of a diffraction grating is typically dependent on the polarization state of the incoming light. A quarter-wavelength wave plate (not shown in the drawing) may be inserted between the diffraction grating 215 and the lens 252 to rotate the polarization state 90 degree before reflected light enters the grating 215 a second time, as is described in more detail below. The addition of a quarter-wavelength wave plate will reduce the polarization dependent loss.

A reflective dot 271, with its size being slightly larger than that of the focused spots 231, 232, and 233, is implemented on moveable plate 270, which is designed to be moveable along the focal plane represented by dashed line 258. (It will be understood that, in practice, the different wavelengths may not all fully focus along the plane 258, and the plate may not perfectly lie on this plane, but that more generally the wave lengths will be focused within a focal region and that the plate will, at least partially, be located within this focal region. More specifically, as real optics will typically focus the different wavelengths on a surface having a small amount of curvature, this may more accurately be referred to as a planar-like or near-planar region.) Moveable plate 270 is inserted into the optical path, and is used to reflect light at focused spot 233, for example, back through the lens 252, to become collimated and parallel beam 223 again before reaching the diffraction grating 215 a second time. The reflected parallel beam 223, emerging from the diffraction grating 215 as collimated beam 212 is then focused by the lens 251 onto the fiber end face 202A of a first output port 202. If desired, the reflective dot 271 can also be slightly off-set spatially, to be partially outside of the focused spot 233, in order to partially attenuate the signal or wavelength that is reflected back to the output port 202. This attenuation function may be required for equalizing the signal power of wavelength(s) being dropped at the node, or being sent on to another node.

It should be noted that the rays shown in FIG. 2 are not drawn to scale, and also reflect some simplifications that are intended to avoid excessive clutter in the drawings. For example, because reflective dot 271 is located away from the optical axis 204A, which in turn is perpendicular to the moving plate 270, there is a very small angular difference between the parallel beam 223 directed toward the reflective dot 271, and the reflected parallel beam 223 that is directed back toward grating 215. As a result, return light beam 212 is tilted slightly, and in the opposite direction of the incoming beam 211, with respect to the optical axis 240. For simplicity of the drawing, the return beam 223 is intentionally drawn to coincide with the incoming beam 223, because of the reflection angle is so small with respect to the original incoming beam. This drawing simplification applies to several of the following drawings as well.

The remaining two focused spots shown in FIG. 2, items 231 and 232, are not reflected by the moving plate 270, and therefore transmit through the moving plate (with additional details described below) where they are coupled to a second diffraction section of lens 253, grating 216, and lens 254, being collimated by the lens 253 with a focal length F3. The two parallel beams 241 and 242, emerging from lens 253, strike a second diffraction grating 216 at slightly different angles, emerging as a single collimated beam 246 that now carries two wavelengths, $\lambda_1$ and $\lambda_2$. Collimated beam 246 is focused by another lens 254, having focal length F4, onto the fiber end face 255 of the second output fiber 209.

The fiber end faces 201A and 202A in the example of FIG. 2 are located on opposite sides) with respect to the optical axis 240. The multi-wavelength optical signal emits from the fiber end face 201A and propagates toward lens 251 and the diffraction grating 215. To ensure that any one of the individual-wavelength focused spots located on the focal plane 258 is reflected by the reflective dot 271 back toward the fiber end face 202A, with sufficient precision to achieve low optical insertion loss, a proper optical distance and relative orientation between the two lenses 251 and 252, their individual focal lengths, and other optical design parameters have to be chosen. In addition, the focal length F3 of lens 253 is preferably equal to the focal length F2 of lens 252, and the focal length F4 of lens 254 is preferably equal to the focal length F1 of lens 251. The diffraction grating 216 is preferred to be optically identical to diffraction grating 215. The optical path length between lens 253 and lens 254 is relatively unconstrained, since the fiber end face 255 (and fiber ferrule 259) can be optically aligned with the focused light from collimated beam 246, as focused by lens 254.

The three port tunable wavelength device described in FIG. 2 is optically bi-directional. FIG. 2 illustrates the device as a wavelength de-multiplexer, which splits multiple incoming wavelengths into two groups. When the two output ports 202 and 209 in FIG. 2 are instead used as two input ports, and the single input port 201 is instead used as an output port, the tunable optical device becomes a tunable wavelength multiplexer, combining two sets of incoming wavelengths onto a single output fiber. It should further be noted that in the de-multiplexer example described above, the designation of the two output ports 202 and 209 as either the drop port, or the express port, is somewhat arbitrary. Wavelength(s) that are focused onto a reflective dot on the moving plate 270, such as reflective dot 271, will be directed toward output port 202, whereas wavelength(s) that are not focused onto a reflective dot on moving plate 270 will pass through, toward output port 209. In the example of FIG. 2, the spatial relationship between the plate 270 and the diffraction section is changed by moving the plate. More generally, the relationship of these elements along the optical paths between the ports could be changed by alternately, or additionally, moving of diffracting sections in order to selectively send the different wavelengths to either the first or second output port.

Furthermore, the embodiment of FIG. 2 can be used as a two-port tunable filter with high wavelength resolution, if the passed-through wavelengths are ignored. The wavelength resolution increases (i.e., the passband of the tunable filter narrows) as the focal length F1 of lens 251 increases, and the beam size (as shown by rays 211) also increases. In the prior art tunable optical filter of U.S. Pat. No. 7,899,330, the beam size is effectively restricted or limited by the dimensions of the movable/tiltable mirror. If a MEMS tilt-mirror is used, typically with a mirror diameter of 1 millimeter or less, then the focal length of Lens 251 (or its equivalent) is limited. As indicated by FIG. 5 in the prior art of U.S. Pat. No. 7,899,330, a beam size conversion element 505 is used to reduce the incoming beam size to better match the size of the MEMS mirror. In contrast, in the arrangement shown in FIG. 2, reflection occurs at, or near, the focal plane of lens 252, such that the spot size at focal plane 258 is small enough for a small reflective dot to reflect a single-wavelength signal completely, without interfering with the rest of wavelengths. Thus, the focal length of the lens 251 can be chosen with more freedom, to meet the requirement or desired level of wavelength resolution at the output port 202.

A typical commercially-available diffraction grating has a dispersion coefficient of 0.08 degrees per nanometer. In a typical 40-channel dense wavelength division multiplexing system, the spacing between two adjacent wavelengths is 0.8 nm. If a focal length F2 of 10 mm is chosen for the lens 252 in FIG. 2, and the distance between grating 215 and lens 252 is also 10 mm, then the distance between two adjacent wavelength spots is tan(0.064 degrees)×10 mm≈11.2 micrometers. The diameter of the wavelength spot is equal to (F2/F1)×the fiber mode-field diameter, which is typically 10 micrometers in diameter. If F1 is 15 mm, then the size of wavelength spots on the focal plane 258 shown in FIG. 2 is about 6.7 micrometers. Since the spot separation of two adjacent wavelengths is 11.2 micrometers, which is sufficiently greater than the focused spot size of 6.7 micrometers, excellent optical isolation between adjacent wavelengths at the output ports is ensured. The size of the reflective dot(s) should be chosen to be between the wavelength spot size, and the separation between two adjacent spots. A typical DWDM system, for example, can carry up to 40 wavelengths with 0.8 nm for wavelength gap. Therefore the maximum motion or travel distance of the moving plate 270 is about 40×11.2 micrometers=448 micrometers, by the above example. To reduce the travel distance further, in order to reduce the switching or tuning time of the device, a shorter focal length F2 for lens 252 may be desirable.

Some DWDM systems carry 80 channels of traffic, with the spacing between two adjacent wavelengths being 0.4 nm. If a focal length of 10 mm is used for lens 252, as described above, this would result in the separation between two adjacent wavelength spots being only 5.6 micrometers.

A longer focal length F1 for lens 251 might be used to similarly reduce the spot size at focal plane 258, to avoid overlap of the focused spots from adjacent wavelengths, which would reduce the optical isolation between adjacent wavelengths at the output ports. Alternatively, a longer focal length F2 for lens 252 could be used, to increase the spacing between adjacent wavelength spots. As can be seen in the above discussion, the focal lengths F1 and F2 of lenses 251 and 252, as well as the size and limits of motion of the moving plate 270, can be adjusted in several ways, to appropriately deal with requirements for adjacent channel isolation, optical insertion loss, and switching/tuning speed, and their associated tradeoffs.

Figure 3A:
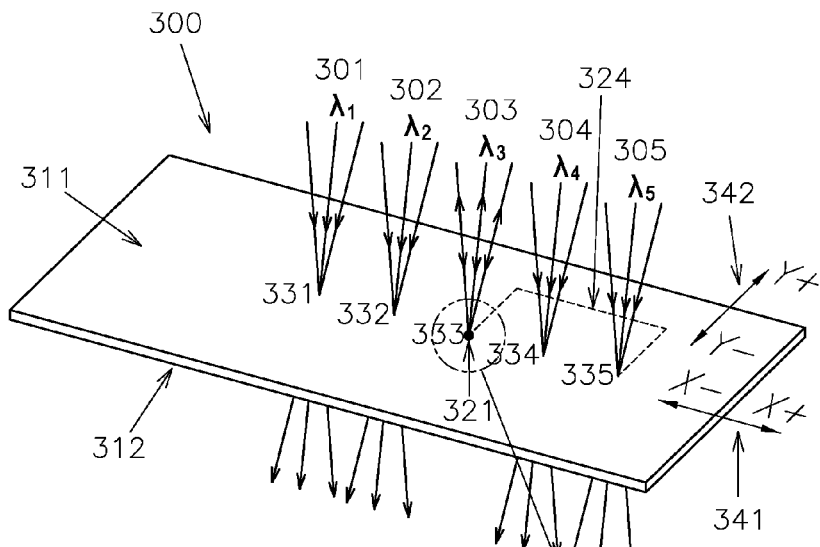
FIGS. 3A, 3B, 3C, 3D, and 3E illustrate how a reflective dot, being fabricated onto a moving plate, reflects one of the focused wavelengths and passes the rest of the wavelengths of the incident signal.

FIG. 3A illustrates a design of the moving plate, for the embodiment shown in FIG. 2 (i.e., the design of moving plate 270). In the example shown in FIG. 3A, five wavelengths 301 to 305 are focused onto one surface 311 of the moving plate 300, to become five wavelength spots 331 to 335, respectively. Every wavelength except wavelength 303 passes through the moving plate 300. The focus spot 333 of selected wavelength 303 hits a reflective dot 321 and is reflected back, as indicated by the upwards-facing arrows on the rays for wavelength 303.

Figure 3B:
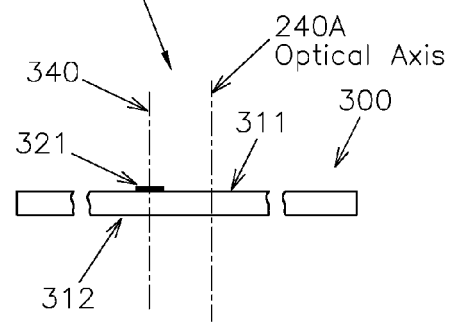

As shown in FIG. 3B, which represents an exploded side view of the portion of the moving plate 300 that is surrounding the reflective dot 321, the normal 340 of the reflective dot 321, is also normal to the top surface 311 of the moving plate, and is chosen to be in parallel to the optical axis 240A. Reflective dots or surfaces whose normal is tilted by a small angle with respect to the optical axis (240A in FIG. 2) will be shown later in FIGS. 7A, 7B and 7C as another embodiment. The moving plate 300 is movable in both X and Y directions as indicated in FIG. 3A by directional arrows 341 and 342, respectively. The reflective dot 321 can be moved from one wavelength spot, shown in FIG. 3A as 333, for wavelength 303, to any of the other wavelength spots (331, 332, 334, or 335) by simply actuating the X-motion (represented by directional arrows 341). However, in order to not interrupt the transmission through the moving plate of other wavelengths (said feature being commonly referred to as "hitless" tuning) during the motion from wavelength spot 333 to wavelength spot 335, for example, it is preferable for the reflective dot 321 to be first moved slightly in the positive Y direction (as represented by directional arrow 342), then in the positive X direction (as represented by directional arrow 341), and then finally in the negative Y direction, to be coincident with wavelength spot 335. The motion trajectory of the reflective dot 321 during this hitless tuning movement is indicated by the dashed line 324.

Figure 3C:
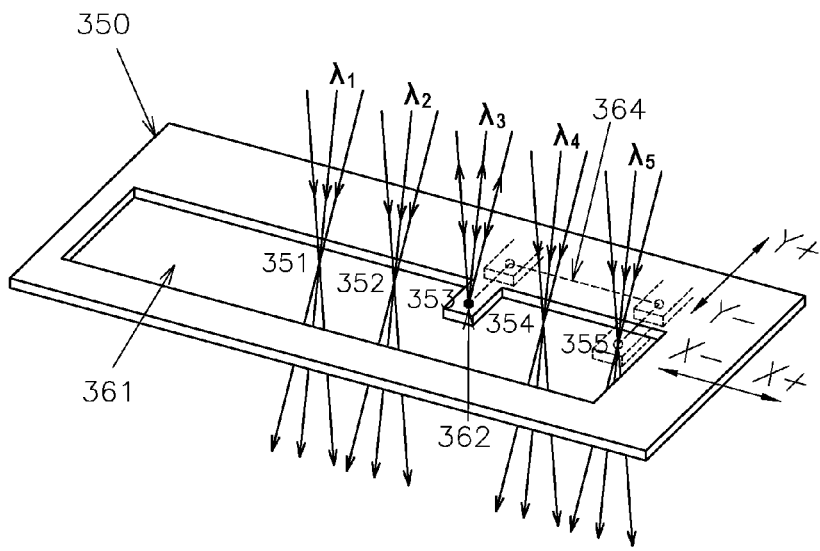

FIG. 3C shows another embodiment of the moving plate, labeled here as item 350. Though the moving plate material is intended to be transparent to all incident wavelengths, Fresnel reflection occurs at both surfaces of the moving plate, as indicated by 311 and 312 in FIG. 3A. Anti-reflection coatings on both surfaces can reduce the Fresnel loss, but increase manufacturing complexity and cost. In order to reduce the insertion loss caused by Fresnel reflections, a slot 361 is cut out of the moving plate 350. A reflective dot 362 reflects wavelength spot 353, similarly to what is indicated in FIG. 3B. In order to move the reflective dot 362 from wavelength spot 353 to wavelength spot 355 without interrupting other wavelength spots, the motion trajectory of the reflective dot 362 is indicated by dashed line 364.

Figure 3D:
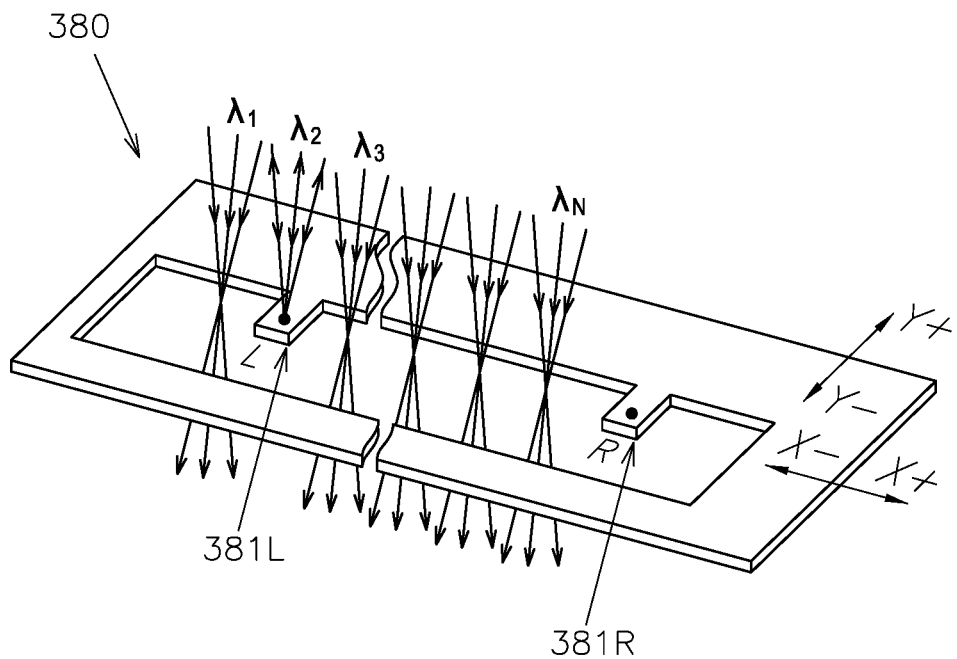
Figure 3E:
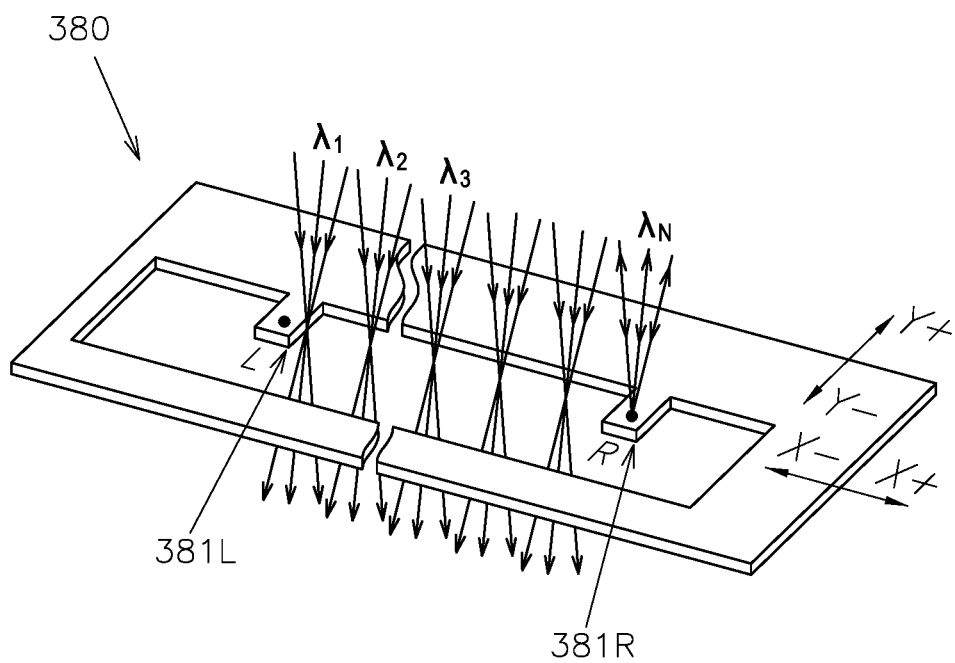

In FIGS. 3A and 3C, the reflective dot shown as 321 in FIG. 3A and 362 in FIG. 3C has to travel across all of the intervening wavelength spots, if the reflected wavelength is switched from $\lambda_1$ (301 in FIG. 3A) to $\lambda_5$ (305 in FIG. 3A). To reduce the switching or tuning time, another moving plate embodiment, with a different reflective section of dot configurations, is illustrated in FIGS. 3D and 3E. Suppose that there are N wavelengths and N is an even integer. The moving plate 380 in FIGS. 3D and 3E carries two reflective dots 381L and 381R, with the distance between them being greater than (N−1) times the separation between two adjacent wavelength spots. Wavelengths numbering 1 to N/2 are defined as the left-hand group of wavelengths, and wavelengths numbering (N/2)+1 to N are defined as the right-hand group. If switching is within the same wavelength group (i.e., from one wavelength in the left-hand group to another wavelength that is also in the left-hand group, or, from one wavelength to another wavelength within the right-hand group, then the corresponding reflective dot, either 381L or 381R, is moved to reflect the desired new wavelength, similar to what was described in FIGS. 3A and 3C. However, if switching or tuning is from one wavelength of the left-hand group (for example, $\lambda_2$ as shown in FIGS. 3D and 3E) to a wavelength of the right-hand group (for example, $\lambda_N$ as shown in FIGS. 3D and 3E), then the reflective dot to be used is changed from 381L to 381R, as shown in FIG. 3E. The same approach is also used in switching or tuning from a wavelength in the right-hand group, to a new wavelength in the left-hand group, in which case the reflective dot used is changed from 381R to 381L. By having two reflective dots, the maximum required motion of moving plate 380 is reduced. Further, since the two reflective dots are separated by more than (N−1) times the spacing between adjacent wavelengths, the "unused" reflective dot will never be unintentionally reflecting or blocking a wavelength that is supposed to be transmitted through the moving plate.

Figure 4:
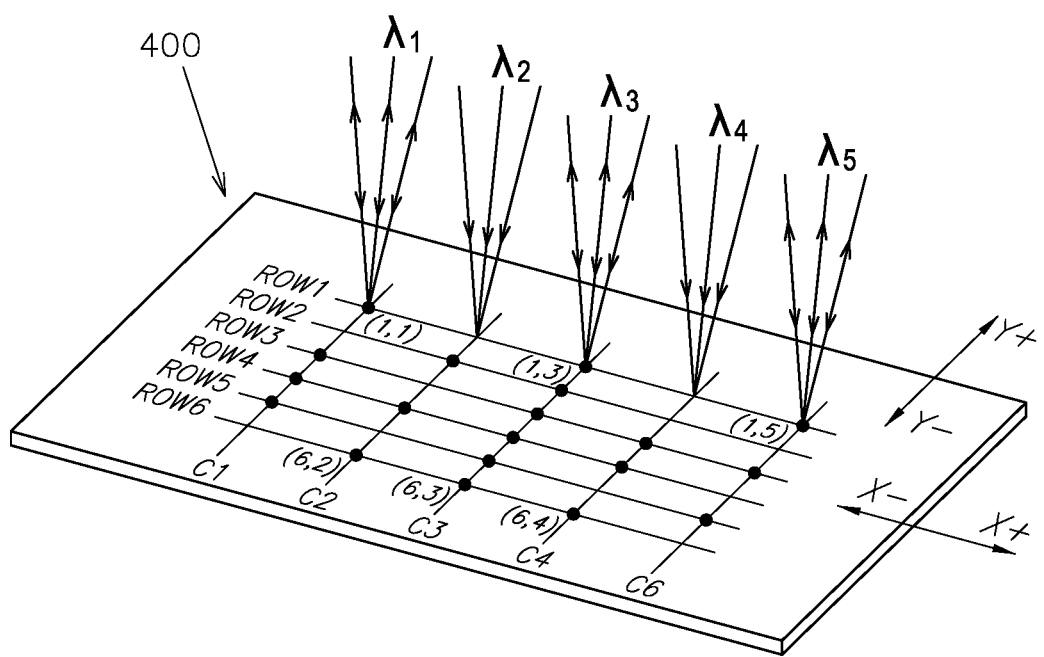
FIG. 4 illustrates a pattern of reflective dots on the moving plate for selecting one or more wavelength(s), to be reflected back to one output port.

FIG. 4 illustrates another embodiment of the moving plate. In this embodiment, multiple reflective dots are arranged in rows and columns on the moving plate 400. The space between two adjacent columns is designed to be identical to the distance between two adjacent wavelengths spots in the focal plane 258 (of FIG. 2). For example, in ROW 1, as shown in FIG. 4, three reflective dots are located at locations (1,1), (1,3) and (1,5), respectively. With the moving plate at this position, moving plate 400 will reflect three wavelengths, $\lambda_1$, $\lambda_3$, and $\lambda_5$ respectively, but will pass $\lambda_2$ and $\lambda_4$. As another example, the three reflective dots at locations (6,2), (6,3), and (6,4) in ROW 6 can be used to reflect three adjacent wavelengths together, by moving the moving plate 400 in the positive Y direction so that the ROW 6 reflective dots become located under the wavelength spots for $\lambda_2$, $\lambda_3$, and $\lambda_4$. As indicated previously in FIGS. 3A and 3C, in order to not interrupt the passed wavelengths, the reflective dots are moved slightly out of the present row of wavelength spots first, before re-entering another row. As in FIG. 3C, slots can be carved within or beside each row of reflective dots in FIG. 4, to reduce Fresnel reflections (although this is not shown in FIG. 4). FIGS. 3A through 3E and FIG. 4 illustrate just a few illustrative patterns of reflective dots. Other dot patterns arranged in a two-dimensional plane can be used.

The moving plate can be moved in a two-dimensional plane by various kinds of actuators, such as high-precision mechanical positioners, piezo-electric actuators, MEMS actuators, etc. MEMS actuators are very suitable because of their small size, high accuracy and repeatable positioning, and easy control. MEMS technology uses photo-lithography to define the structural features of the MEMS device, uses etching to remove material from the structure, and uses vapor deposition to deposit material to the structure. The dimensional accuracy of MEMS fabrication processes is typically as good as or better than the sub-micrometer level, which meets or exceeds the accuracy requirements for fabricating actuators.

Figure 5A:
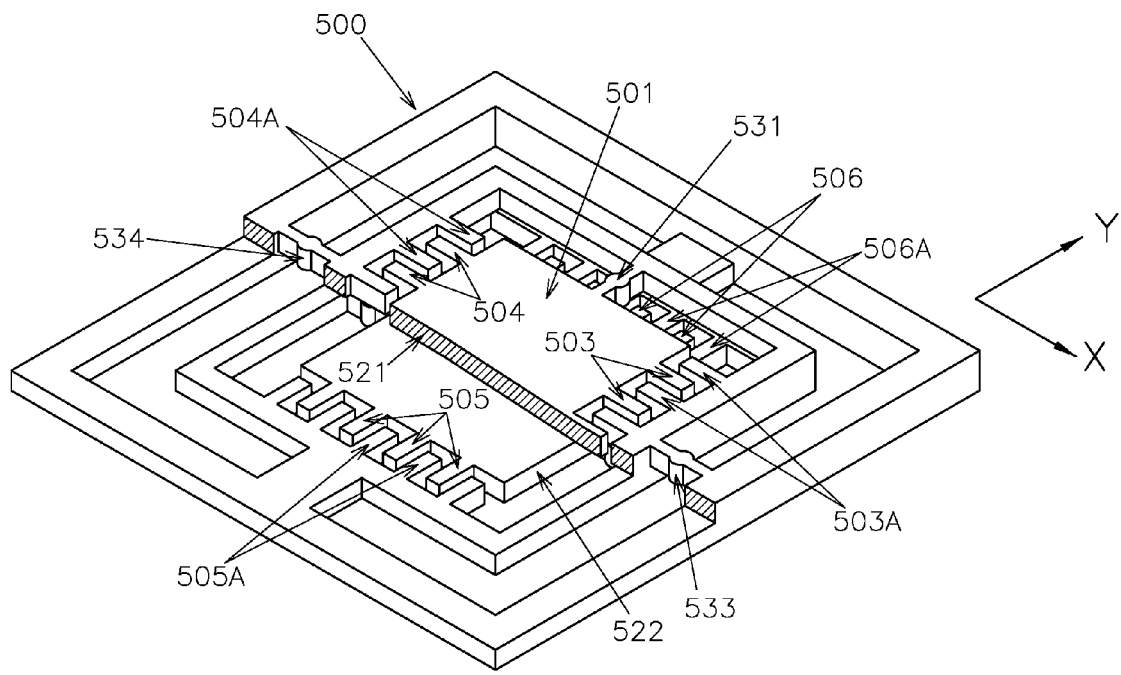
FIG. 5A is a perspective view illustrating a design of 2-dimensional moving plate, using Micro-Electro-Mechanical-System (MEMS) technology.
Figure 5B:
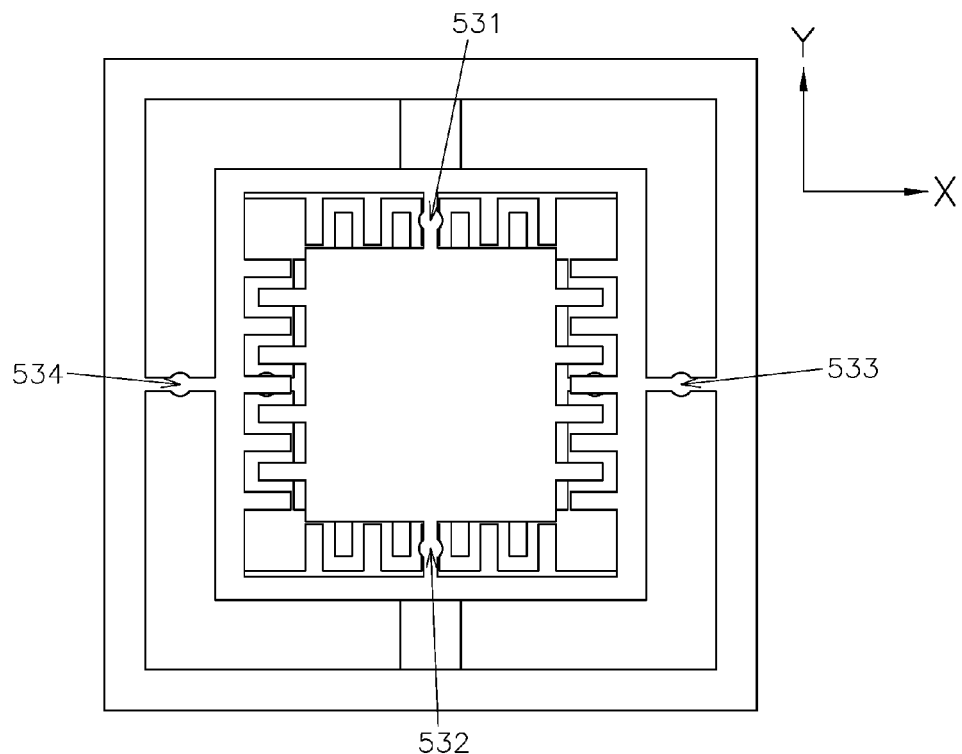
FIG. 5B is the top view of FIG. 5A.

FIG. 5A provides a perspective view of a MEMS actuator chip 500, utilizing electrostatic force to drive the motion, and is shown for illustration purposes. Other MEMS designs using different force mechanisms, such as magnetic force, are also applicable. In FIG. 5A, the moving plate 501 has two sets of comb fingers, 503 and 504, located on each side of the X axis, respectively, in the device's upper layer 521, and two additional sets of comb fingers, 505 and 506, located on each side of the Y axis, respectively, in the bottom layer 522. Another comb finger set 503A is hinged to the chip 500 via the cantilever beams 533 and 534 and is interleaved with comb finger set 503. When a voltage or potential difference is applied across or between these two comb finger sets, 503 and 503A, an attraction force is induced, bending cantilever beams 531 and 532 toward the positive X direction. (Note that cantilever beam 532 doesn't appear in FIG. 5A, since part of the device's upper layer is not shown in this figure. Cantilever beams 531 and 532 are both shown in top view FIG. 5B.) The same electrostatic actuation principle applies to the other pairs of comb finger sets, 504 associated with 504A, 505 with 505A, and 506 with 506A. Applying a voltage difference across comb finger sets 504 and 504A will bend cantilever beams 531 and 532 toward the negative X direction. Similarly, applying a voltage difference across comb finger sets 505 and 505A will bend cantilever beams 533 and 534 in the negative Y direction, and applying a voltage difference across comb finger sets 506 and 506A will bend cantilever beams 533 and 534 in the positive Y direction. In this way, the moving plate 501 can be moved in a two-dimensional plane. Note that in FIGS. 5A and 5B, only four or five fingers are shown in each comb finger set, for illustration purposes. However, practical electrostatic actuator designs usually have tens of fingers within each comb finger set.

Figure 6A:
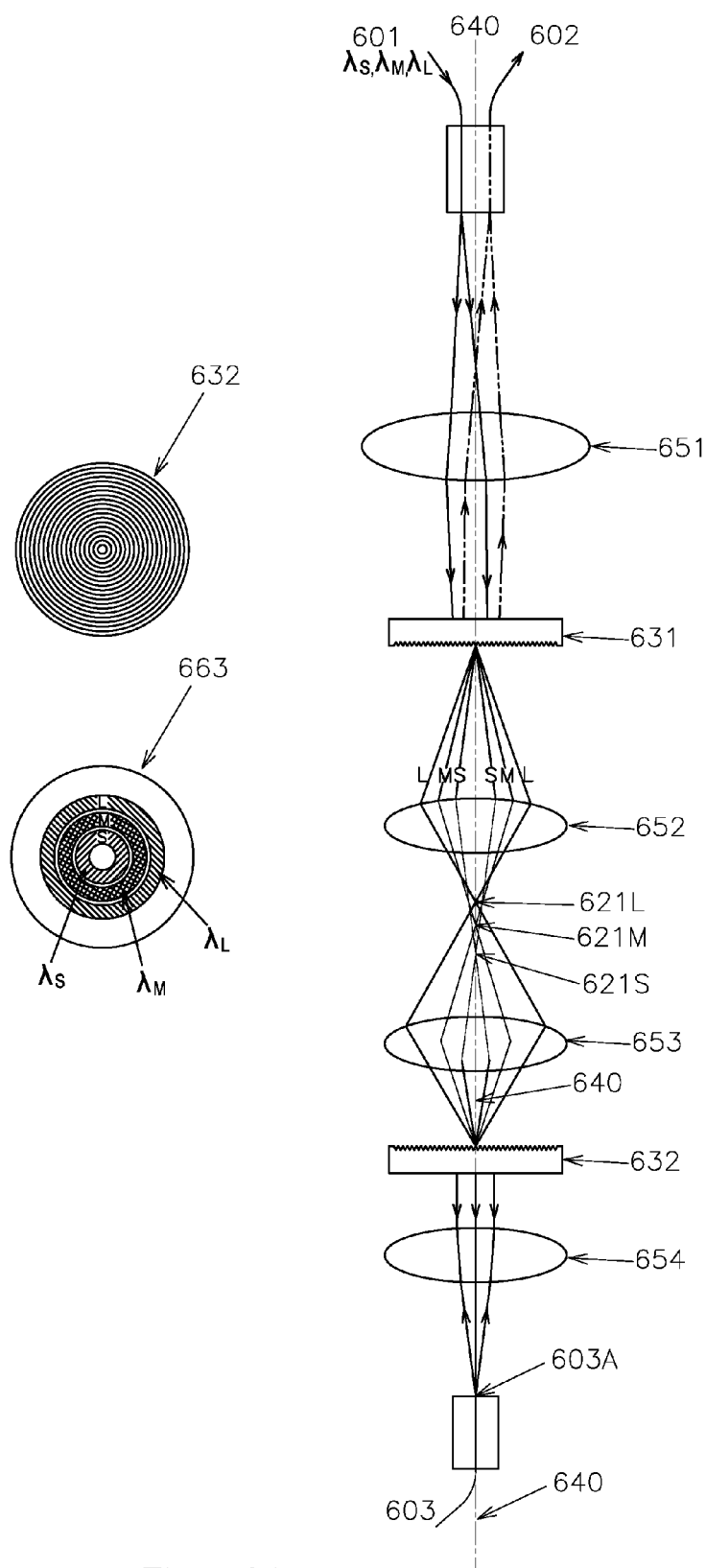
FIGS. 6A, 6B, and 6C show another embodiment. A circular diffraction grating is used to angularly shift or translate multiple wavelengths to different angles. One or several of the wavelengths are reflected back to a first output port, and the rest of the wavelengths are recombined and sent to a second output port.
Figure 6B:
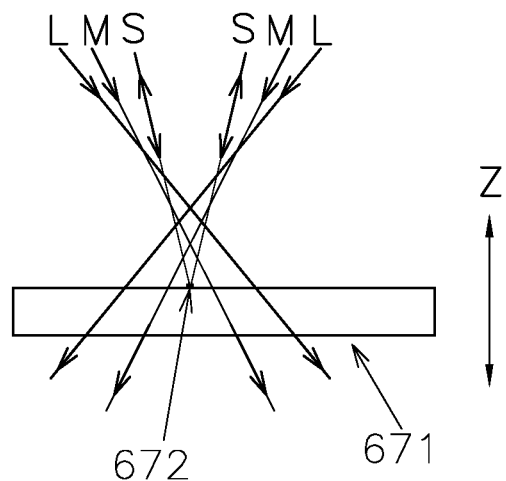
Figure 6C:
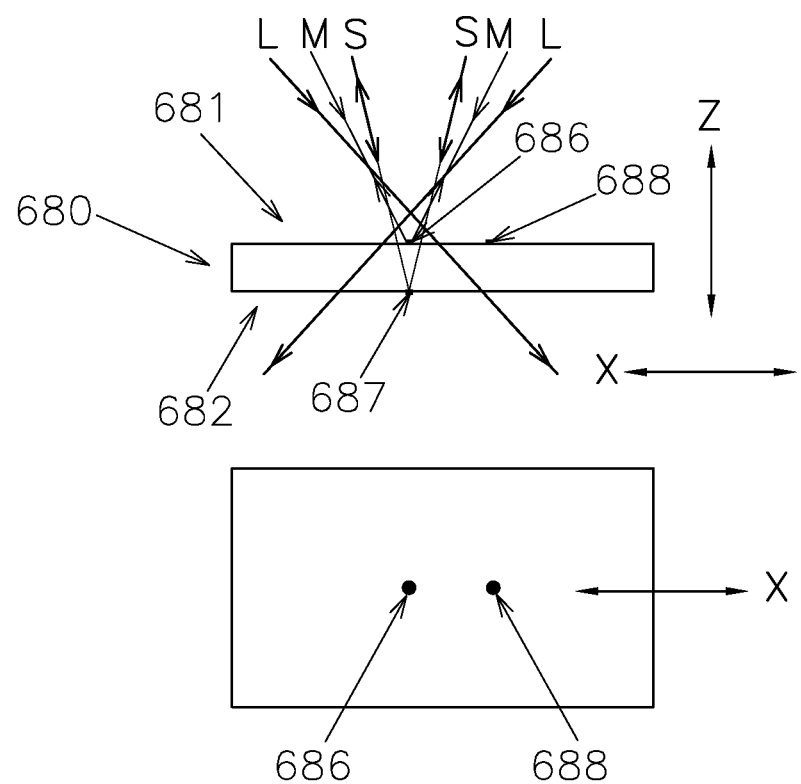

FIGS. 6A, 6B and 6C illustrate another embodiment. A circular diffraction grating 631 is used to replace the linear grating 215 of FIG. 2. A view of the grooved face of the circular diffraction grating is shown as item 632. The optical configuration or assembly of optical fibers 601 and 602, and lens 651 is similar to its counterpart in FIG. 2. In FIG. 6A, the multi-wavelength collimated beam that emerges from lens 651 passes through the circular diffraction grating 631, and is angularly dispersed outward, depending on wavelength. The longer the wavelength is, the more it is diffracted outward, at higher angle. In FIG. 6A, three wavelengths are shown being present on input fiber 601, as an example, and are labeled with subscripts L, M, and S (representing a longer wavelength, a medium wavelength, and a shorter wavelength, respectively). The circular diffraction grating 631 creates three collimated beams of different wavelengths, denoted by L, M, and S, which are projected onto lens 652 as three concentric optical rings, also marked with L, M and S, as shown in cross-section drawing 663. However, as a result of the combined effects of one or more aberration factors, such as spherical effects, chromatic dispersion of lens material, and dielectric coatings on lens surfaces, etc., the three wavelengths are focused at three slightly different locations 621L, 621M and 621S, respectively, along the optical axis 640, with $\lambda_L$ being focused closest to lens 652. (Relative to FIG. 2, the focal region is now no longer a planar region normal to the optical axis, but now a region including different positions along the axis.) As indicated in the detail drawing shown in FIG. 6B, a moving plate 671 that is coated with a reflective dot 672, is inserted into the optical path at a position (i.e., the focal point for $\lambda_S$, labeled as 621S in FIG. 6A) to reflect $\lambda_S$ back towards output fiber 602, while allowing $\lambda_M$ and $\lambda_L$ to pass through it. If the moving plate 671 is moved in the Z direction, the reflective dot 672 can be positioned at the focal points for either $\lambda_M$ (labeled as 621M in FIG. 6A), or $\lambda_L$ (labeled as 621L in FIG. 6A), while passing the unselected wavelengths. In order to switch or tune from one selected wavelength to another, without affecting or interrupting any other unselected wavelength, the moving plate and its reflective dot able to move laterally, away from the optical axis (i.e., in the X or Y direction), both before and after it is moved in the Z direction.

FIG. 6C shows reflective dots 686 and 687 that are coated on both sides, 681 and 682, of the moving plate 680. In the example shown in Figure C, two wavelengths, $\lambda_S$ and $\lambda_M$, are being simultaneously reflected by the two reflective dots, while $\lambda_L$ is passing through the moving plate 680. The thickness of the moving plate 680 is determined by the distance between the focal point spots along the optical axis 640, of the two desired wavelengths, $\lambda_S$ and $\lambda_M$. A small portion of the light of $\lambda_L$, as well as a small portion of the light of $\lambda_S$, are blocked by reflective dot 686, but this optical loss is negligible for practical applications.

Referring again to FIG. 6A, the wavelength(s) that pass through the moving plate are then collimated by another lens 653, before passing through the other circular diffraction grating 632. The passed wavelengths are then focused by lens 654 to the fiber end face 603A of the output fiber 603. Similar to the embodiment shown in FIG. 2, the three-port device described above and in FIGS. 6A, 6B, and 6C is also optically bi-directional, and can be used as a two-port device with the advantages described above, if the passed wavelength(s) are ignored.

It should also be noted that the moving plate of the embodiment shown in FIGS. 6A, 6B, and 6C, can be designed to have multiple reflective dots on both the top and bottom surfaces, with a variety of patterns. Also, the moving plate may be designed to have reflective dots on multiple levels in the Z direction, and not just the two levels represented by the top and bottom surfaces of the moving plate. If the moving plate is movable in the X and/or Y direction, as well as the Z direction (as shown in FIG. 6C), then a wide variety of wavelength selection and pass-through configurations can be incorporated. Also, referring to FIG. 6C, if the distance between the top-surface reflective dot 686, and the bottom-surface reflective dot 687 (and therefore the thickness of moving plate 680) is greater than the distance between the focal point spots of the shortest and longest wavelengths that are present on the input fiber, then it is possible to reduce switching or tuning time by using either the top-surface reflective dot or the bottom-surface reflective dot, depending on which one requires less motion of the moving plate, similar to what was described earlier for the FIG. 2 embodiment. The ability to move the moving plate in either the X or Y direction, as well as in the Z-direction, also enables hitless tuning between wavelengths.

Figure 7A:
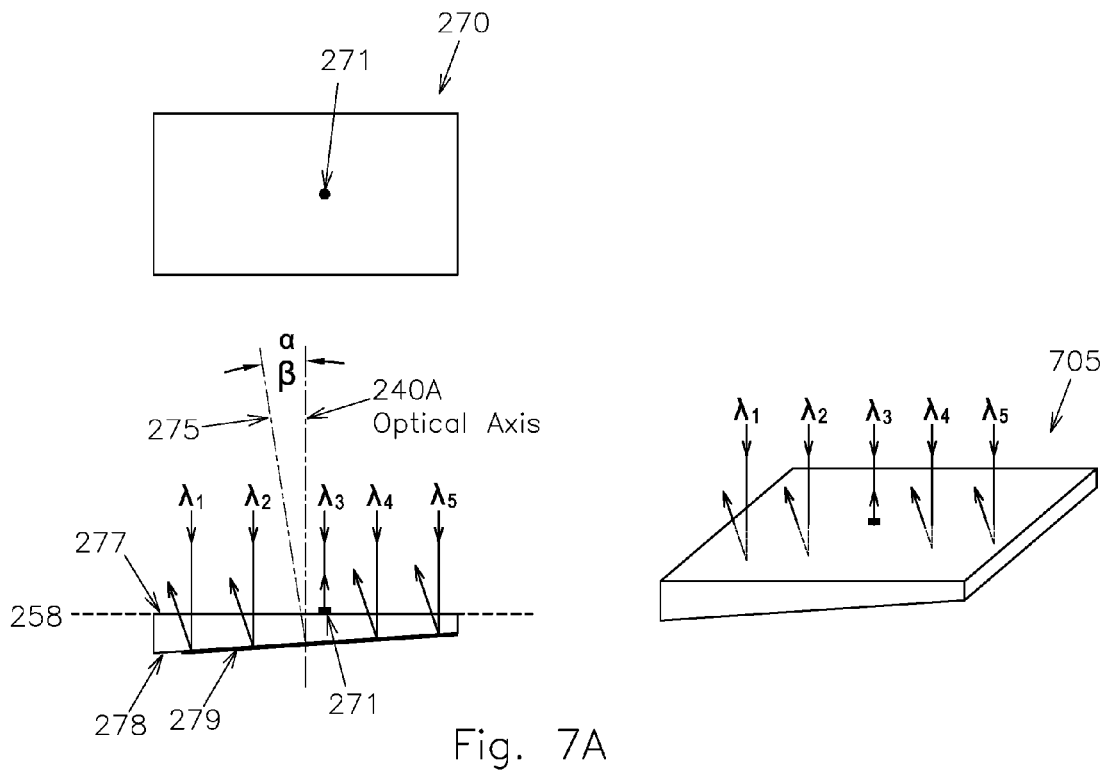
FIGS. 7A and 7B illustrate another embodiment, in which the moving plate has reflective dots or areas on both sides, in order to reduce the number of optical elements and their size.
Figure 7B:
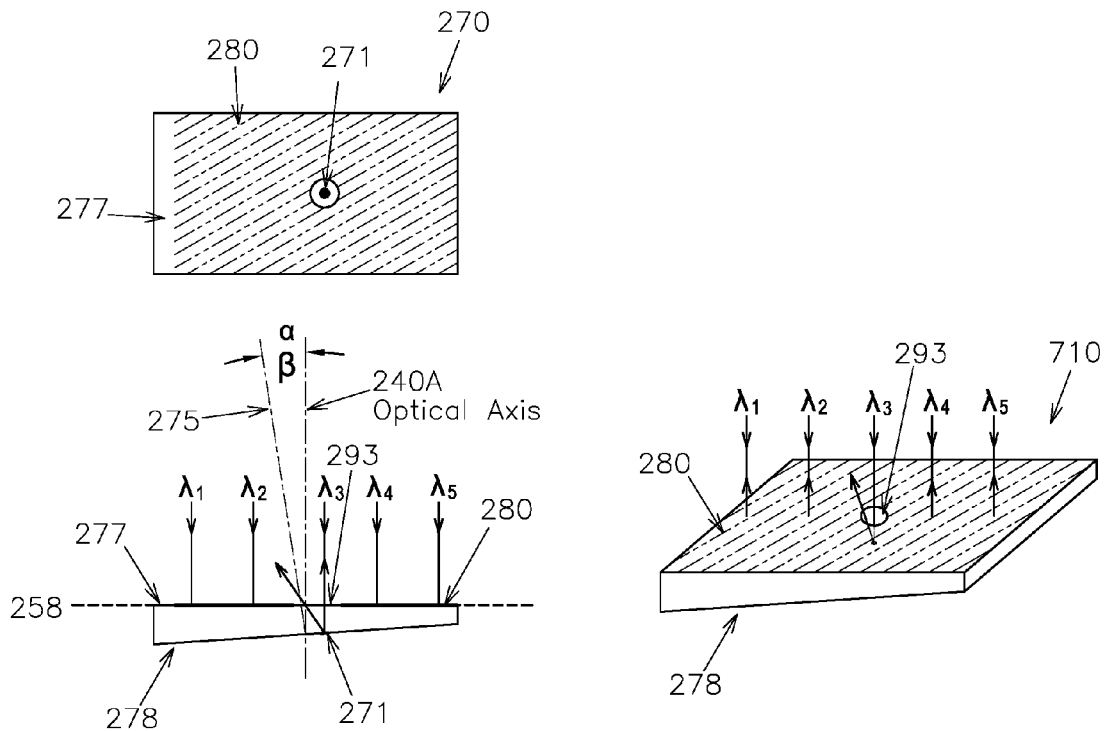

In FIG. 2, the passed wavelengths pass through the moving plate and are then collected by a set of optical elements, which essentially mirror the set of optical elements on the "input" side of the moving plate. FIGS. 7A and 7B illustrate the design of the moving plate for another embodiment, with a reflective pattern on each side of the moving plate. The two reflective layers of this embodiment are used to split the incoming wavelengths into two groups, and reflect both groups of wavelengths back to two individual and separate output ports, located to the side of the input port. Referring back to FIG. 2, since both sets or groups of wavelengths are now being reflected back toward the input fiber (i.e., both output fibers are now located close to the input fiber), the "mirrored" optical elements of FIG. 2 are no longer needed.

As shown in FIG. 7A, the optical axis 240A is normal to the top surface 277 of the moving plate 270. The normal 275 to the bottom surface 278 is tilted with respect to the optical axis 240A by a small angle, that can be defined by two angular components, $\alpha$ and $\beta$. A reflective coating 279 is applied to the bottom surface 278. In the example shown in FIG. 7A, five wavelengths ($\lambda_1$ through $\lambda_5$) are incident on the top surface 277, which is placed or located to coincide with the focal plane 258 in FIG. 2. Wavelength $\lambda_3$ is reflected by the reflective spot 271, and the remaining four wavelengths pass through the moving plate thickness, and are then reflected by reflective coating 279, with a small angle that can be defined as $2\alpha$ and $2\beta$ with respect to the optical axis 240A. Thus, both the selected wavelength $\lambda_3$, and the unselected wavelengths, $\lambda_1$, $\lambda_2$, $\lambda_4$, and $\lambda_5$, are being reflected toward the same fiber ferrule, labeled as ferrule 203 in FIG. 2.

Because the thickness of the moving plate 270 is on the order of a few micrometers, which is far smaller than the focal length F2 of lens 252 (in FIG. 2), the wavelength spots on the reflective coating 279 may be somewhat out of focus, but only slightly, such that only a small optical loss is induced when the signals are coupled back to an output fiber. Drawing 705 provides a perspective view of the moving plate 270.

Alternatively, as shown in FIG. 7B, the reflective dot 271 can be coated on the button surface 278 of moving plate 270, with the wide-area reflective coating 280 being applied to the top surface 277. In this embodiment, the focal plane 258 coincides with the reflective layer 280. It is notable that the top reflective coating 280 has an opening 293 to allow the selected wavelength $\lambda_3$ to pass through the moving plate, in order to reach the reflective dot 271 on the bottom surface 278. The opening 293 is sized, shaped, and located appropriately, so that the reflected wavelength $\lambda_3$ can also pass back through the opening, at its small angle. Drawing 710 provides a perspective view.

The complex dot patterns shown in FIG. 4 are also applicable to be implemented to the top surface in FIG. 7A, and to the bottom surface in FIG. 7B, respectively, in order to segregate the incoming wavelengths into two groups as desired. By using the moving plate design shown in FIG. 7A or 7B, the "mirrored" set of optical elements shown in FIG. 2, including lens 253, the second diffraction grating 216, lens 254 and fiber ferrule 259, can be eliminated completely. This reduces the size of the three port device structure and material cost.

Figure 8:
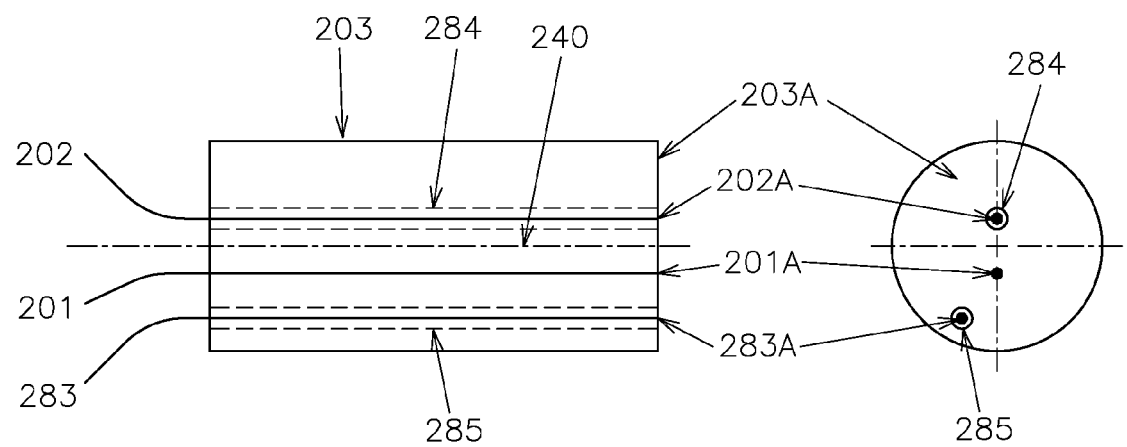
FIG. 8 illustrates a ferrule with three fiber ports, designed to align with the propagation of wavelength signals within the device.

Embodiments that use the moving plate design of Figure A or Figure B, thereby eliminating the "mirrored" optical elements as described above, requires a fiber ferrule that incorporates the input optical fiber, and both output optical fibers. This new fiber ferrule design is shown in more detail in FIG. 8, and is intended to replace fiber ferrule 203 in FIG. 2. In both FIG. 8 and FIG. 2, multiple wavelengths are present on input fiber 201, and emit from the fiber end face 201A. Assuming the moving plate embodiment shown in FIG. 7A, the selected wavelength ($\lambda_3$ in either FIG. 7A or FIG. 7B) will be reflected back via lens 252, diffraction grating 215, and lens 251 (as shown in FIG. 2) to fiber end face 202 A of output fiber 202, which is preferably chosen to be axially symmetric with respect to the optical axis 240 (as shown in both FIG. 8 and FIG. 2. The remaining four unselected wavelengths ($\lambda_1$, $\lambda_2$, $\lambda_4$, and $\lambda_5$ in FIG. 7A) are reflected back to fiber end face 283A of output fiber 283 (as shown in FIG. 8), whose location on the ferrule end surface 203A of fiber ferrule 203 is determined by the two angle components α and β (as shown in FIG. 7A).

Conversely, if the moving plate embodiment shown in FIG. 7B is used, then $\lambda_3$ is reflected back to fiber end face 283A, and the rest of the wavelengths are projected to fiber end face 202A. Note that although the above description referred to an input fiber and two output fibers, for ease of description, the three-port device described above is also optically bi-directional, and can therefore be viewed as having two input fibers and one output fiber.

Generally speaking, the relative positions of fiber end faces 202 A and 283A, with respect to fiber end face 201A, can be chosen arbitrarily depending on how the normal of reflective dot 271 and the normal of the reflective surface 279 in FIG. 7A, or the normal of reflective dot 271 and reflective surface 280 in FIG. 7B, are oriented with respect to the optical axis 240. For practical manufacturing purposes, both output port fibers 202 and 283 are allowed to have some spatial freedom within fiber bores 284 and 285, respectively, of the ferrule 203, for optically aligning the fibers 202 and 283, respectively. Fiber bores 284 and 285 are indicated using dashed lines (and circles in the end view) in FIG. 8. The spatial freedom of output fibers 202 and 283, within fiber bores 284 and 285, allows optimization of optical alignment, to minimize the optical insertion loss within the device, prior to fixing the output fibers in place within the fiber bores of ferrule 203.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

It is claimed:

1. A tunable wavelength optical device, comprising:
    a first diffraction section configured such that light of different wavelengths of a beam of light coupled thereto from a first port are diffracted into different wavelength components, focusing the light of the different wavelength components within a focal region;
    a plate at least partially positioned within a portion of the focal region,
    the plate having one or more first reflective sections that reflect light of one or more of the wavelength components coupled thereto from the first diffraction section towards the first diffraction section so that light is diffracted a first time and a second time by the first diffraction section in an optical path between the first port and a second port, and
    where the plate transmits light of wavelength components other than those coupled to the first reflective sections in an optical path between the first port and a third port, along which the light of wavelength components other than those coupled to the first reflective sections is diffracted a first time by the first diffraction section; and
    an actuator connected to change the position of the plate within the focal region relative to the first diffraction section, whereby a first set of a selected one or more of the wavelength components each focus on one of the first reflective sections of the plate to be reflected between the first port and the second port along the optical path therebetween, and one or more of the wavelength components not in the first set are directed between the first port and the third port.

2. The tunable wavelength optical device of claim 1, wherein the first port is connectable as an input port and the second and third ports are connectable as output ports.

3. The tunable wavelength optical device of claim 1, wherein the first port is connectable as an output port and the second and third ports are connectable as input ports.

4. The tunable wavelength optical device of claim 1, wherein the actuator is configured to move the plate.

5. The tunable wavelength optical device of claim 1, wherein the first diffraction section includes a circular diffraction grating.

6. The tunable wavelength optical device of claim 5, wherein the actuator is configured to move the plate to change a distance along the optical path between the plate and the first port.

7. The tunable wavelength optical device of claim 1, wherein the first diffraction section includes a linear diffraction grating and focuses the light of the different wavelength components within a planar or near-planar focal region.

8. The tunable wavelength optical device of claim 7, wherein the actuator is configured to move the plate laterally relative to the optical path between the plate and the first port.

9. The tunable wavelength optical device of claim 1, wherein the first diffraction section includes a first lens, a second lens and a diffraction grating intermediately located between the first and second lens along the optical path between the plate and the first port.

10. The tunable wavelength optical device of claim 1, wherein the actuator includes one or more of a Micro-Electro-Mechanical-System (MEMS) type of actuator, a piezo-electric type of actuator, or a high-precision mechanical type of positioner.

11. The tunable wavelength optical device of claim 1, further comprising:
    a second diffraction section, wherein the plate transmits light of wavelength components not coupled to the first reflective sections to be diffracted a second time by the second diffraction section along an optical path between the plate and the third port.

12. The tunable wavelength optical device of claim 11, wherein the second diffraction section includes a first lens, a second lens and a diffraction grating intermediately located between the first and second lens along the optical path between the plate and the third port.

13. A tunable wavelength optical device, comprising:
    a first diffraction section configured such that light of different wavelengths of a beam of light coupled thereto from a first port are diffracted into different wavelength components, focusing the light of the different wavelength components within a focal region;
    a plate at least partially positioned within a portion of the focal region,
    the plate having one or more first reflective sections that reflect light of one or more of the wavelength components coupled thereto from the first diffraction section towards the first diffraction section so that light is diffracted a first time and a second time by the first diffraction section in an optical path between the first port and a second port, and where the plate directs light of wavelength components other than those coupled to the first reflective sections in an optical path between the first port and a third port, along which the light of wavelength components other than those coupled to the first reflective sections is diffracted a first time by the first diffraction section; and an actuator connected to change the position of the plate within the focal region relative to the first diffraction section, whereby a first set of a selected one or more of the wavelength components each focus on one of the first reflective sections of the plate to be reflected between the first port and the second port along the optical path therebetween, and one or more of the wavelength components not in the first set are directed between the first port and the third port, wherein the plate reflects light of wavelength components not coupled to the first reflective sections from a second reflective section at an angle relative to wavelength components coupled to the reflective section to be diffracted a second time by the first diffraction section in an optical path between the plate and the third port, and wherein the plate is formed such that the surface of the plate further from the first port is inclined an angle relative to the surface of the plate nearer to the first port.

14. The tunable wavelength optical device of claim 13, wherein the one or more first reflective sections are on the surface of the plate nearer to the first port and the second reflective section is formed on the surface of the plate further from the first port.

15. The tunable wavelength optical device of claim 13, wherein the one or more first reflective sections are on the surface of the plate further from the first port and the second reflective section is formed on the surface of the plate nearer to the first port.

16. The tunable wavelength optical device of claim 13, wherein the tunable wavelength optical device further comprising a ferrule at which first, second, and third fibers are connectable, corresponding to the first, second and third ports.

17. The tunable wavelength optical device of claim 1, wherein the plate includes a plurality of first reflective sections, each having a different set of one or more reflective elements whereby a corresponding set of one or more of the wavelength components will be passed from the first port to the second port.

18. The tunable wavelength optical device of claim 1, wherein when changing the plate from a first position, in which the first set of the wavelength components each focus on one of the first reflective sections, to a second position, in which a second set of a selected one or more of the wavelength components each focus on one of the first reflective sections, the plate directs light of wavelength components coupled thereto in an optical path between the first port and the third port.

19. The tunable wavelength optical device of claim 18, wherein when moving the plate from the first position to the second position, the actuator moves the plate along a first axis, subsequently moves the plate along a second axis, and subsequently moves the plate along the first axis.

20. A tunable wavelength optical device, comprising:
a diffraction section configured such that light of different wavelengths of a beam of light coupled thereto from a first port are diffracted into different wavelength components, focusing the light of the different wavelength components within a focal region;

a plate at least partially positioned within a portion of the focal region, the plate having one or more reflective sections configured to reflect light of one or more of the wavelength components coupled thereto from the diffraction section towards the diffraction section so that light is diffracted a first time and a second time by the diffraction section in an optical path between the first port and a second port, the plate further configured to transmit light incident thereon that is not coupled to the one or more reflective sections; and an actuator connected to change the position of the plate within the focal region relative to the diffraction section so that a selected one or more of the wavelength components each focus on one of the reflective sections of the plate to be reflected between the first port and the second port along the optical path therebetween.

21. The tunable wavelength optical device of claim 20, where the plate directs light of wavelength components other than those coupled to the reflective sections in an optical path between the first port and a third port, along which the light of wavelength components other than those coupled to the reflective sections is diffracted a first time by the diffraction section; and wherein the actuator is further connected to change the position of the plate within the focal region relative to the diffraction section so that one or more of the wavelength components not selected are directed between the first port and the third port.

22. The tunable wavelength optical device of claim 20, wherein the diffraction section includes a circular diffraction grating.

23. The tunable wavelength optical device of claim 22, wherein the actuator is configured to move the plate to change a distance along the optical path between the plate and the first port.

24. The tunable wavelength optical device of claim 20, wherein the diffraction section includes a linear diffraction grating and focuses the light of the different wavelength components within a planar or near-planar focal region.

25. The tunable wavelength optical device of claim 24, wherein the actuator is configured to move the plate laterally relative to the optical path between the plate and the first port.

26. The tunable wavelength optical device of claim 20, wherein the diffraction section includes a first lens, a second lens and a diffraction grating intermediately located between the first and second lens along the optical path between the plate and the first port.

27. The tunable wavelength optical device of claim 20, wherein the actuator includes one or more of a Micro-Electro-Mechanical-System (MEMS) type of actuator, a piezo-electric type of actuator, or a high-precision mechanical type of positioner.

28. A method, comprising:
receiving a beam of light at a first port;
directing the beam of light to be incident on a first diffraction section;
diffracting by the first diffraction section of the beam of light into different wavelength components, such that the light of the different wavelength components is focused within a focal region;
positioning a plate having one or more reflective sections to be at least partially within a portion of the focal region, where the plate is positioned so that:
a first set of a selected one or more of the wavelength components incident on the one or more reflective sections from the first diffraction section each focus on one of the reflective sections of the plate to be reflected back towards the first diffraction section; and light of wavelength components other than those incident on the reflective section are transmitted by the plate in an optical path between the plate and a third port; and diffracting by the first diffraction section of the first set of wavelength components a second time in an optical path from the plate to a second port.

29. The method of claim 28, wherein positioning the plate includes altering the distance of the optical path between the plate and the second port.

30. The method of claim 28, wherein positioning the plate includes moving the plate laterally relative to the optical path between the plate and the second port.

31. The method of claim 28, further comprising:
diffracting by a second diffraction section of light of wavelength components other than those incident on the reflective section in the optical path from the plate to the third port.

32. The method of claim 28, further comprising:
diffracting by the diffraction section of light of the wavelength components other than those incident on the reflective section a second time in the optical path from the plate to the third port.

33. The method of claim 28, further comprising:
subsequent to positioning the plate, re-positioning the plate within a portion of the focal region, wherein the plate is re-positioned so that:
a second set of a selected one or more of the wavelength components incident on the one or more reflective sections from the first diffraction section each focus on one of the reflective sections of the plate to be reflected back towards the first diffraction section; and
light of wavelength components other than those incident on the reflective section are directed by the plate in an optical path between the plate and the third port; and
diffracting by the first diffraction section of the second set of wavelength components a second time in an optical path from the plate to a second port.

34. The method of claim 33, further comprising:
subsequent to positioning the plate and prior to re-positioning the plate, directing all of the wavelength components from the first port to the third port.

35. The method of claim 33, wherein re-positioning the plate includes:
moving the plate laterally relative to the optical path between the plate and the second port along a first axis;
subsequently moving the plate laterally relative to the optical path between the plate and the second port along a second axis; and
subsequently moving the plate laterally relative to the optical path between the plate and the second port along the first axis.

36. A method, comprising:
receiving a first set of one or more wavelength components at a first port;
directing the first set of wavelength components to be incident on a first diffraction section;
diffracting by the first diffraction section of the first set of wavelength components, the first set of wavelength components being focused within a focal region;
receiving a second set of one or more wavelength components at a second port;
directing the second set of wavelength components to be incident on a plate, the plate having one or more reflective sections;

positioning the plate at least partially within a portion of the focal region, where the plate is positioned so that:
the first set of wavelength components is incident on the one or more reflective sections from the first diffraction section to be reflected back towards the first diffraction section; and
the second set of wavelength components are transmitted by the plate in an optical path between the second port and the first diffraction section;
diffracting by the first diffraction section of the first and second sets of wavelength components, whereby the first and second sets of wavelength components are combined into a beam of light in an optical path from the plate to a third port.

37. The method of claim 36, wherein positioning the plate includes altering the distance of the optical path between the plate and the third port.

38. The method of claim 36, wherein positioning the plate includes moving the plate laterally relative to the optical path between the plate and the third port.

39. The method of claim 36, wherein directing the second set of wavelength components to be incident on a plate includes:
diffracting by a second diffraction the second set of wavelength components in the optical path from the plate to the second port.

40. The method of claim 36, wherein directing the second set of wavelength components to be incident on a plate includes:
diffracting by the diffraction the second set of wavelength components in the optical path from the plate to the second port.

41. The method of claim 36, further comprising:
subsequent to positioning the plate, re-positioning the plate within a portion of the focal region, wherein the plate is re-positioned so that:
a third set of a selected one or more of the wavelength components received at the first port are incident on the one or more reflective sections from the first diffraction section, each focusing on one of the reflective sections of the plate to be reflected back towards the first diffraction section; and
a third set of wavelength components received at the second port are directed by the plate in an optical path between the second port and the first diffraction section; and
diffracting by the first diffraction section of the third set of wavelength components a second time in an optical path from the plate to a second port.

42. The method of claim 41, further comprising:
subsequent to positioning the plate and prior to re-positioning the plate, directing all of the wavelength components from the first port to the third port.

43. The method of claim 41, wherein re-positioning the plate includes:
moving the plate laterally relative to the optical path between the plate and the third port along a first axis;
subsequently moving the plate laterally relative to the optical path between the plate and the third port along a second axis; and
subsequently moving the plate laterally relative to the optical path between the plate and the third port along the first axis.

* * * * *